(12) United States Patent
Fujiwara et al.

(10) Patent No.: US 6,675,929 B2
(45) Date of Patent: Jan. 13, 2004

(54) STEERING CONTROL APPARATUS FOR MOTOR VEHICLE

(75) Inventors: Kotonori Fujiwara, Shizuoka (JP); Naoki Hikosaka, Aichi (JP); Katsuhiro Suda, Kanagawa (JP); Takao Nojiri, Kawasaki (JP)

(73) Assignees: Fuji Kiko Co., Ltd., Kosai (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/024,515

(22) Filed: Dec. 21, 2001

(65) Prior Publication Data

US 2002/0096388 A1 Jul. 25, 2002

(51) Int. Cl.$^7$ ................................................. B62D 5/04
(52) U.S. Cl. ..................................................... 180/444
(58) Field of Search ................................. 180/443, 444, 180/446

(56) References Cited

U.S. PATENT DOCUMENTS

| | | | |
|---|---|---|---|
| 3,983,763 A | 10/1976 | Adams | |
| 5,174,407 A | 12/1992 | Shimizu et al. | |
| 5,267,625 A | * 12/1993 | Shimizu | 180/443 |
| 5,284,219 A | * 2/1994 | Shimizu et al. | 180/444 |
| 5,503,239 A | 4/1996 | Shimizu | |
| 6,000,491 A | * 12/1999 | Shimizu et al. | 180/444 |

FOREIGN PATENT DOCUMENTS

| | | |
|---|---|---|
| EP | 0 310 729 | 4/1989 |
| EP | 0 723 094 | 7/1996 |
| FR | 614654 | 12/1926 |
| JP | 7-323852 | 12/1995 |
| JP | 10-305779 | 11/1998 |
| JP | 2000-309277 | 11/2000 |

\* cited by examiner

Primary Examiner—Kevin Hurley
(74) Attorney, Agent, or Firm—Foley & Lardner (57) ABSTRACT

A steering control apparatus for motor vehicles includes an output shaft for steering a steered wheel, a slider arranged on the outer periphery of an end of the output shaft to be slidable axially linearly, a converting mechanism arranged between the output shaft and the slider for converting linear motion of the slider into rotary motion which is transmitted to the output shaft, a drive mechanism for urging the slider to stroke axially, and an ECU for controlling the drive mechanism.

32 Claims, 11 Drawing Sheets

STEERING CONTROL APPARATUS FOR MOTOR VEHICLE

BACKGROUND OF THE INVENTION

The present invention relates to a steering control apparatus for motor vehicles, which changes the ratio of the steering angle of a steering handle or steering wheel to the turning angle of a steered wheel.

Various so-called steering control apparatus are proposed which comprise a variable gear-ratio mechanism on a steering-force transfer path between the steering handle and the steered wheel, wherein the gear ratio of the turning angle of the steered wheel, i.e. steering-angle ratio, is changed in accordance with the steering angle of the steering handle to achieve a larger control amount of the turning angle of the steered wheel at a smaller steering angle of the steering handle. One of the steering control apparatus is disclosed in JP-A 10-305779 wherein the variable gear-ratio mechanism comprises a friction-type continuously variable transmission.

SUMMARY OF THE INVENTION

With the above steering control apparatus, however, the control range and variation of the gear ratio cannot be set optionally freely using the vehicle speed as a control parameter, leading to difficulty of achieving optimum control in accordance with the vehicle speed and vehicle type.

It is, therefore, an object of the present invention to provide a steering control apparatus for motor vehicle, which allows optimum control in accordance with the vehicle speed and vehicle type.

The present invention provides generally a steering control apparatus for a motor vehicle which comprises an output shaft which steers a steered wheel; a slider arranged on an outer periphery of an end of the output shaft, the slider being slidable axially linearly; a converting mechanism arranged between the output shaft and the slider, wherein the converting mechanism converts linear motion of the slider into rotary motion which is transmitted to the output shaft; a drive mechanism which urges the slider to stroke axially; and an electronic control unit (ECU) which controls the drive mechanism.

A main feature of the present invention is to provide a steering control apparatus for a motor vehicle which comprises an input shaft rotated by a steering handle; an output shaft arranged substantially coaxial with the input shaft, the output shaft steering a steered wheel; a slider arranged on an outer periphery of an end of the output shaft on the side of the input shaft and at an end of the input shaft on the side of the output shaft, the slider being slidable axially linearly; a converting mechanism arranged between the output shaft and the slider, wherein the converting mechanism converts linear motion of the slider into rotary motion which is transmitted to the output shaft; a drive mechanism which urges the slider to stroke axially; and an electronic control unit (ECU) which controls the drive mechanism.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings, a steering control apparatus for a motor vehicle embodying the present invention will be described.

Figure 1:
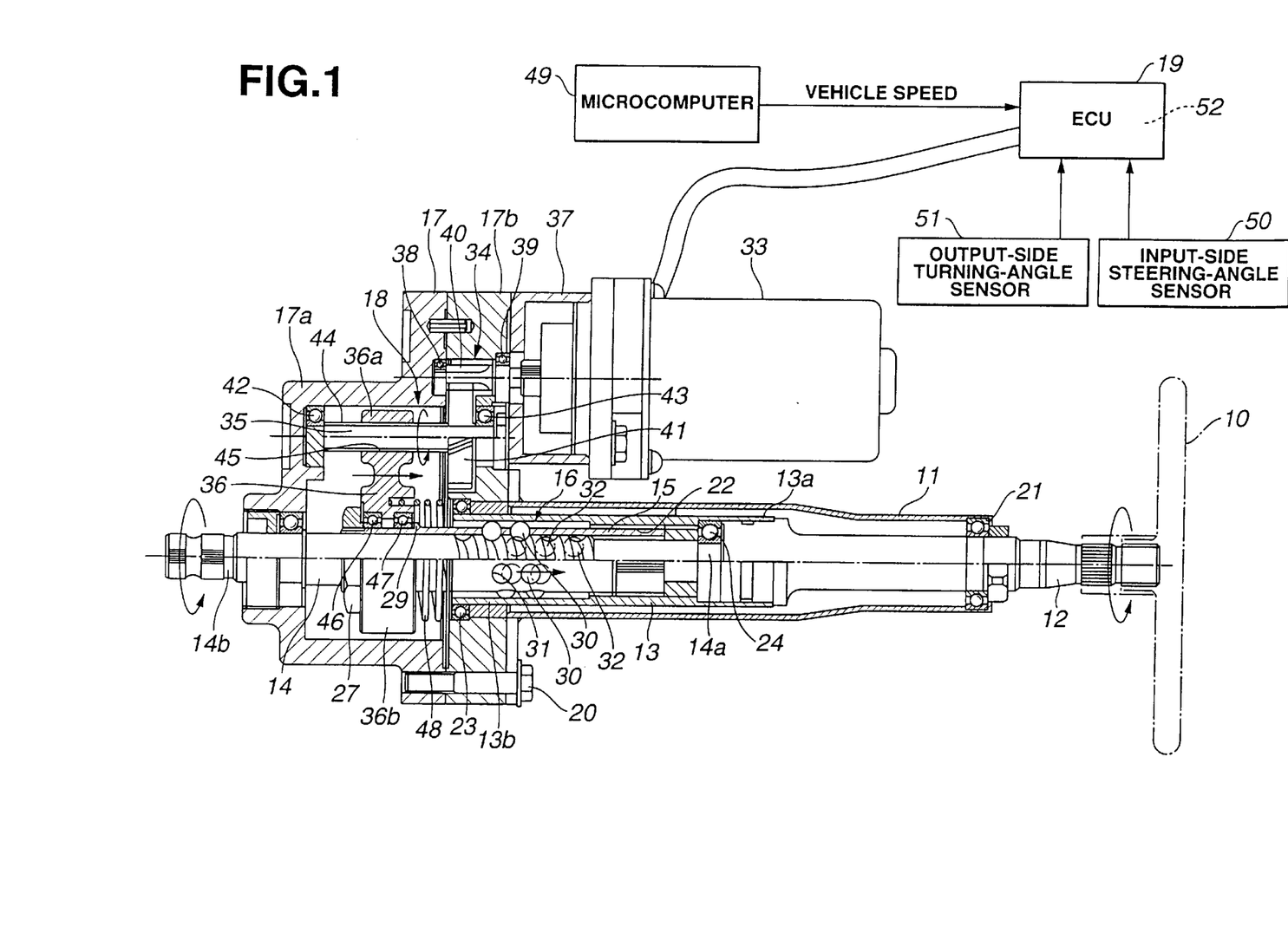
FIG. 1 is a block diagram of a first embodiment of a steering control apparatus according to the present invention.

FIG. 1 shows a first embodiment of the present invention wherein the steering control apparatus comprises a cylindrical steering column 11, an upper shaft 12 arranged through the steering column 11 from an end thereof, a cylindrical input shaft 13 accommodated in the steering column 11, an output shaft 14 having one end 14a arranged through the input shaft 13, a cylindrical slider 15 axially slidably arranged at the outer periphery of the output shaft 14, a converting mechanism 16 arranged between the slider 15 and the output shaft 14 for converting linear motion of the slider 15 into rotary motion to transfer it to the output shaft 14, a drive mechanism 18 arranged in a casing 17 connected to the tip of the steering column 11 for urging the slider 15 to stroke, and an electronic control unit (ECU) 19 for controlling operation of the drive mechanism 18. These input shaft 13, output shaft 14, slider 15, converting mechanism 16, drive mechanism 181 and ECU 19 constitute a variable gear-ratio mechanism.

The casing 17 comprises a main body 17a having an inner space and a cover 17b fixed to an open end of the main body 17a by a bolt 20.

The upper shaft 12 has an outer end protruding from an end of the steering column 11, to which a steering handle or steering wheel 10 is connected. Moreover, the upper shaft 12 is rotatably supported by a bearing 21 arranged in the end of the steering column 11.

Figure 2:
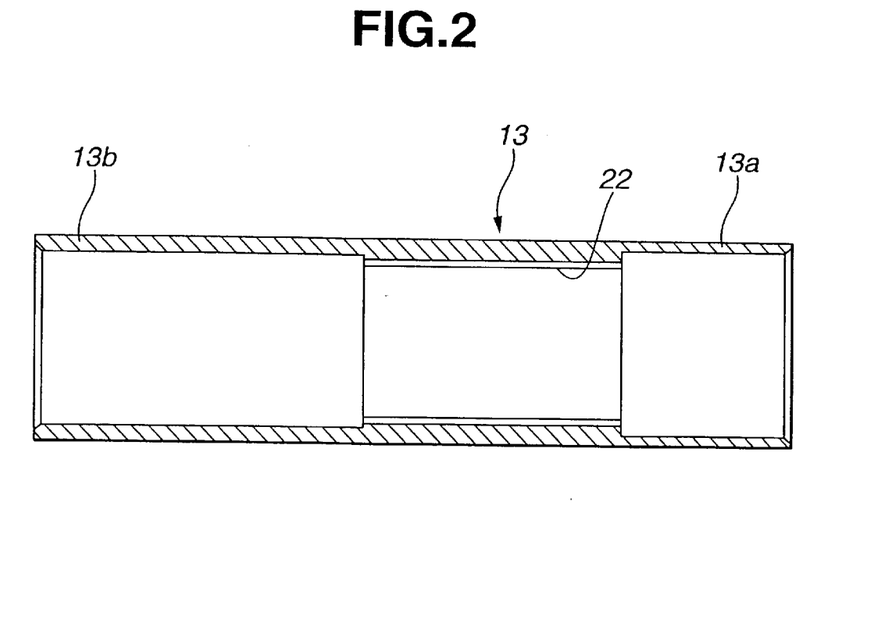
FIG. 2 is a longitudinal section showing an input shaft.

Referring to FIGS. 1–2, the input shaft 13 has one end 13a press-fit into the tip of the upper shaft 12 and a spline-like guide groove 22 formed on the entire inner peripheral face to extend axially from the one end 13a to the center. Another end 13b is rotatably supported by the cover 17b of the casing 17 through a bearing 23.

Figure 3:
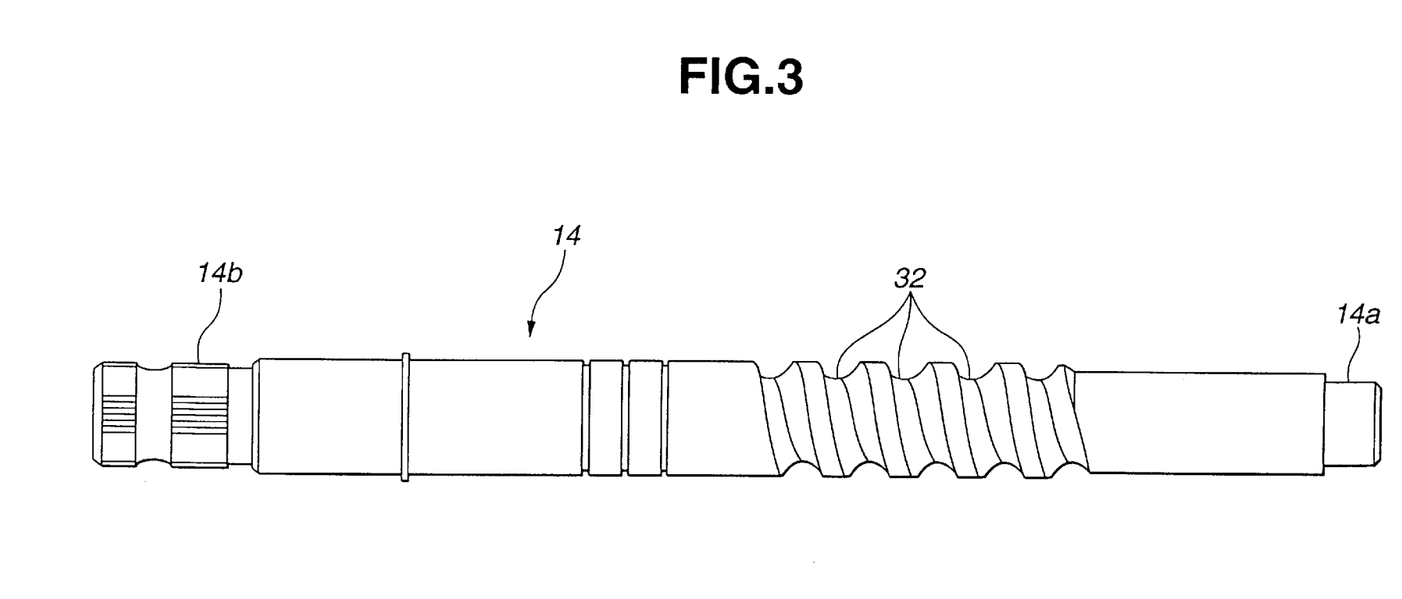
FIG. 3 is a front view showing an output shaft.

Referring to FIGS. 1 and 3, the output shaft 14 has one end 14a arranged rotatably with respect to the input shaft 13 through a bearing 24 arranged between the output shaft 14 and the one end 13a of the input shaft 13, and another end 14b arranged through the casing 17 and coupled to a rack/pinion mechanism or transmission mechanism, not illustrated, connected to a steered wheel.

As shown in FIG. 1, the slider 15 has an inner peripheral face disposed on an outer peripheral face of the output shaft 14 through a slight clearance to allow its axial movement. Moreover, referring to FIG. 4, the slider 15 has a guide protrusion 26 formed axially on the outer peripheral face of the one end 15a arranged through the steering column 11, the guide protrusion 26 being engaged with the guide groove 22 of the input shaft 13 to allow axial movement of the slider. The slider 15 also has an external thread 28 formed at another end 15b arranged through the casing 17 to be meshed with a nut 27, and an annular protrusion 29 integrally formed with the outer peripheral face to cooperate with the nut 27 for supporting one end of a slider arm 36 as will be described later.

Figure 4:
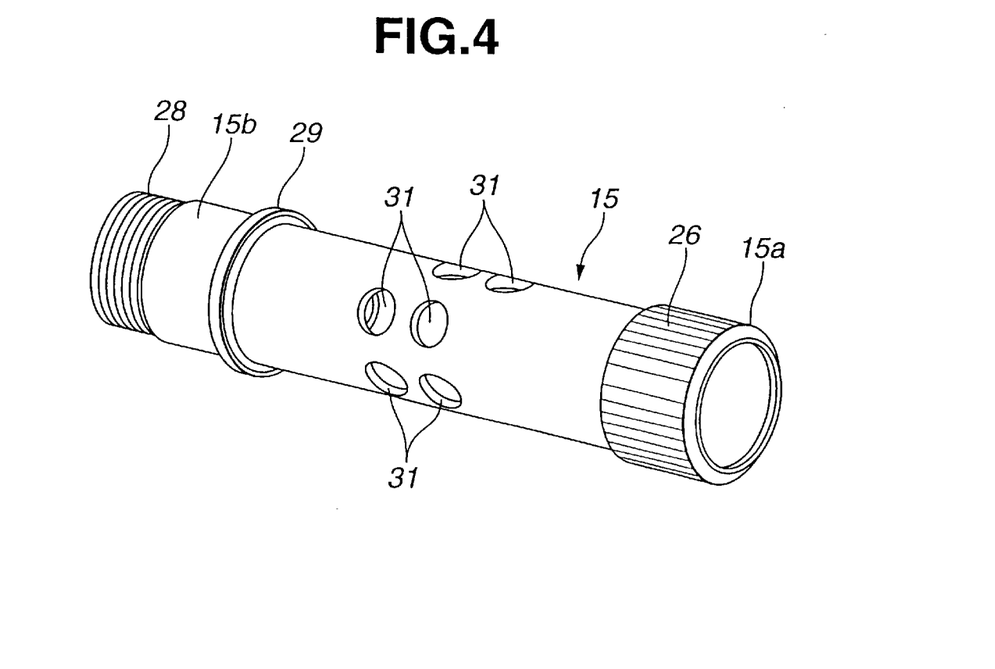
FIG. 4 is a perspective view showing a slider.

Referring to FIGS. 1 and 3–4, the converting mechanism 16 comprises a plurality of ball holding holes 31 formed through the slider 15 substantially in the center to hold balls 30 in a rolling way, and a ball-screw groove 32 formed substantially in the center of the outer peripheral face of the output shaft 14. The balls 30 are held in a rolling way between the bottom of the ball screw 32 and the inner peripheral face of the input shaft 13.

Each ball holding holes 31 is formed through a circumferential wall of the slider 15, and has the inner diameter slightly larger than the diameter of the ball 30 to allow rolling of the ball 30. Six sets of ball holding holes 31 are arranged circumferentially in being shifted axially, wherein each set of two holes are disposed in parallel.

The ball-screw groove 32 is formed spirally, has a width to allow free rolling of the balls 30 therein.

As shown in FIG. 1, the drive mechanism 18 comprises a DC motor 33 mounted to the outer wall of the casing 17, a speed reducer 34 arranged in the casing 17 for reducing the rotating speed of the motor 33, a lead screw shaft 35 or rotation shaft rotated by the speed reducer 34, and a slider arm 36 interposed between the lead screw shaft 35 and the slider 15 for transmitting as linear motion torque of the lead screw shaft 35 to the slider 15.

The motor 33 is mounted to the outside face of the cover 17b through a bracket 37 to be adjacent and in parallel to the steering column 11. The motor 33 is controlled to rotate in the normal and reverse directions by control current provided from the ECU 19.

The speed reducer 34 is rotatably supported between the casing 17a and the cover 17b by bearings 38, 39, and comprises a pinion gear 40 axially coupled to the motor 33 and a helical gear 41 meshed with the pinion gear 40. The helical gear 41 has a fixing hole formed in the center, with which an end of the lead screw shaft 35 is engaged by a key member, etc., not illustrated.

The lead screw shaft 35 has both ends rotatably supported by a pair of bearings 42, 43 arranged inside the casing main body 17a and in the cover 17b, and an external thread 44 formed on the outer peripheral face thereof.

The slider arm 36 is shaped roughly like a letter 8, and has one end 36a having inner peripheral face formed with an internal thread 45 to be meshed with the external thread 44 of the lead screw shaft 3, and another end 36b rotatably coupled to the another end 15b of the slider 15 through right and left bearings 47, 48. Axial movement of the another end 36b is restricted by inner races of the bearings 46, 47 being supported in the pressed state by the annular protrusion 29 of the slider 15 and the nut 27.

A coil spring 48 is loaded between the another end 36b of the slider arm 36 and the cover 17b to provide a spring force for pressing the slider arm leftward as viewed in FIG. 1, thus eliminating clearances between the balls 30, the ball holding holes 31, and the ball-screw groove 32 for prevention of backlash.

The ECU 19 receives not only actual vehicle-speed information signals through a microcomputer 49 for checking the engine operating conditions in accordance with information signals derived from various sensors, but also information signals derived from a steering-angle sensor 50 of the upper shaft 12 and a turning-angle sensor 51 of the output shaft 14. In accordance with these input signals, the microcomputer 52 or control circuit performs computing to provide control current to the motor 33.

The following explains concrete operation of the first embodiment. When failing to actuate the variable gear-ratio mechanism, for example, in the high-speed area of the vehicle, the slider arm 36 is held at a substantially intermediate position in the longitudinal direction as viewed in FIG. 1 by the motor 33. With this, the slider 15 is also held at the intermediate position without stroke. As a result, when turning the steering handle 10 rightward or leftward, the steering effort is transmitted from the upper shaft 12 to the output shaft 14 through the input shaft 13, slider 15, and balls 30, which is in turn transmitted to the steered wheel through the rack/pinion mechanism without producing the difference in rotation angle between the input and output.

When actuating the variable gear-ratio mechanism, i.e. when turning the steering handle 10 maximally in one direction, for example, in the low-speed/medium-speed area of the vehicle, operation is as follows. If the motor 33 is rotated, for example, in the normal direction by control current derived from the ECU 19 which has detected the vehicle speed and steering angle, the lead screw shaft 35 is rotated in one direction by the speed reducer 34 to move the slider arm 36 rightward, i.e. from the position shown in FIG. 1 to that shown in from FIG. 5 through the external and internal threads 44, 45. Therefore, the slider 15 strokes linearly in the same direction to press the balls 30 rightward by means of an edge of the ball holding holes 31. This makes the balls 30 stroke in rotating, which provides torque of a given speed to the output shaft in the ball-screw groove 32 along the spiral shape thereof. With this, the output shaft 14 is rotated in one direction at a greater variation than a change in steering or rotation angle of the steering handle 10 to turn the steered wheel at a larger turning angle through the rack/pinion mechanism.

Figure 5:
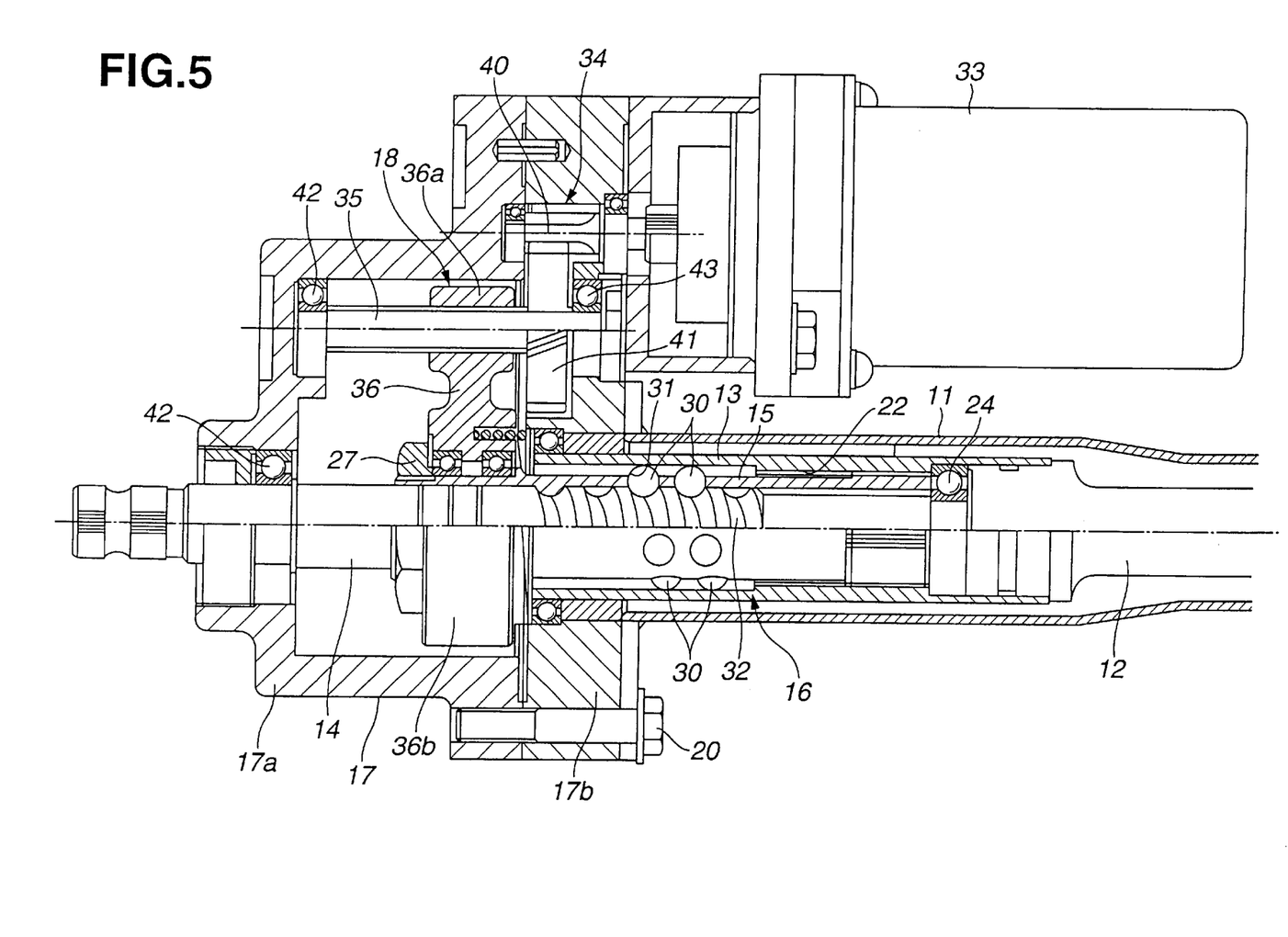
FIG. 5 is a longitudinal section for explaining operation of the first embodiment.
Figure 6:
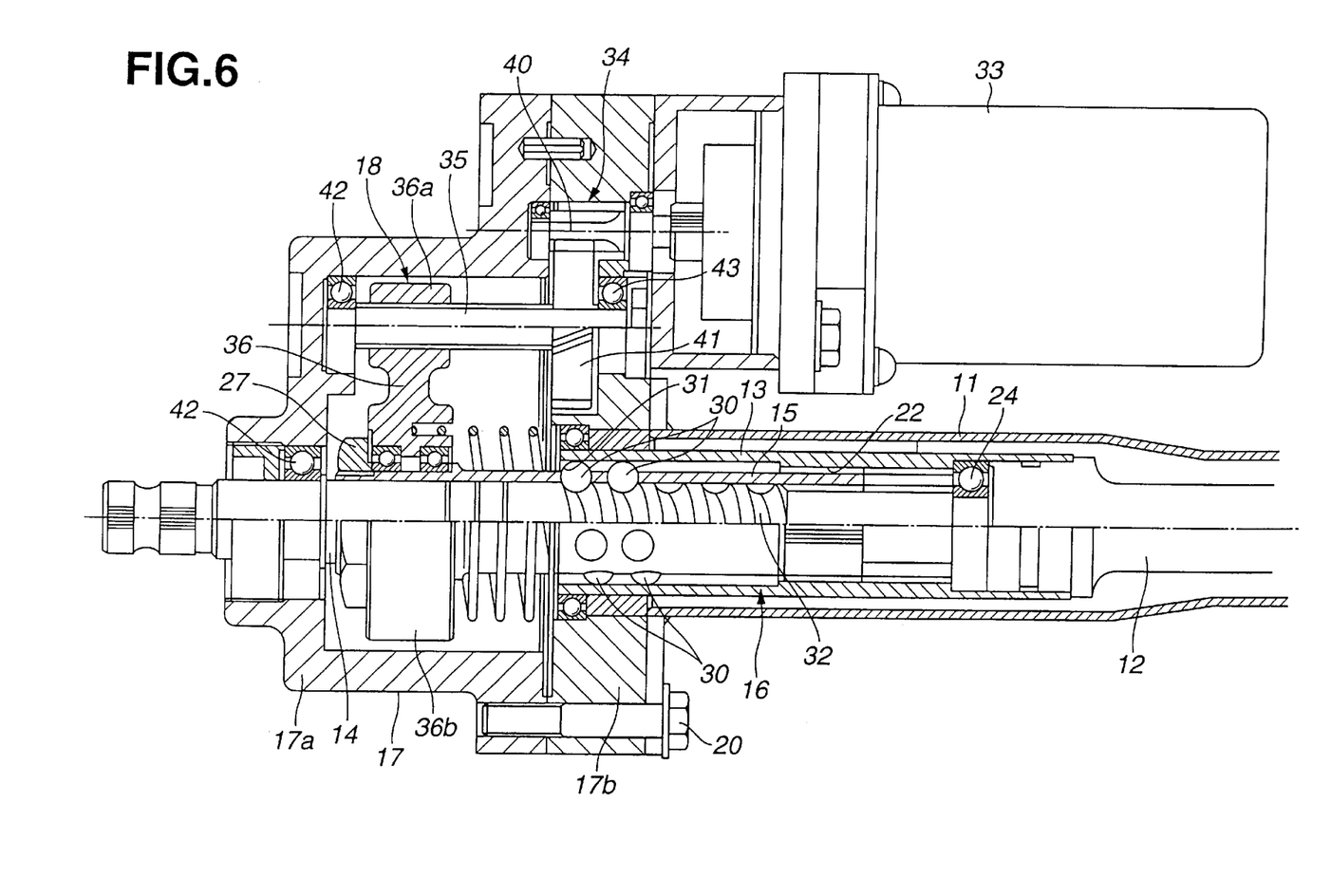
FIG. 6 is a view similar to FIG. 5, for explaining operation of the first embodiment.

On the other hand, when maximally turning the steering handle 10 from the neutral position, i.e. position shown in FIG. 1 or the rightmost position, i.e. position shown in FIG. 5 to another position, operation is as follows. If the motor 33 is rotated, for example, in the reverse direction by control current derived from the ECU 19 which has detected the vehicle speed and steering angle, the lead screw shaft 35 is rotated in another direction by the speed reducer 34 to move the slider arm 36 leftward, i.e. from the position shown in FIG. 1 or 5 to that shown in FIG. 6 through the external and internal threads 44, 45. Therefore, the slider 15 strokes linearly in the same direction to press the balls 30 leftward by means of an edge of the ball holding holes 31. This makes the balls 30 stroke in rotating, which provides torque of a given speed to the output shaft 14 in the ball-screw groove 32. With this, the output shaft 14 is rotated in another direction at a greater variation than a change in steering angle of the steering handle 10 to turn the steered wheel at a larger turning angle through the rack/pinion mechanism.

Figure 7:
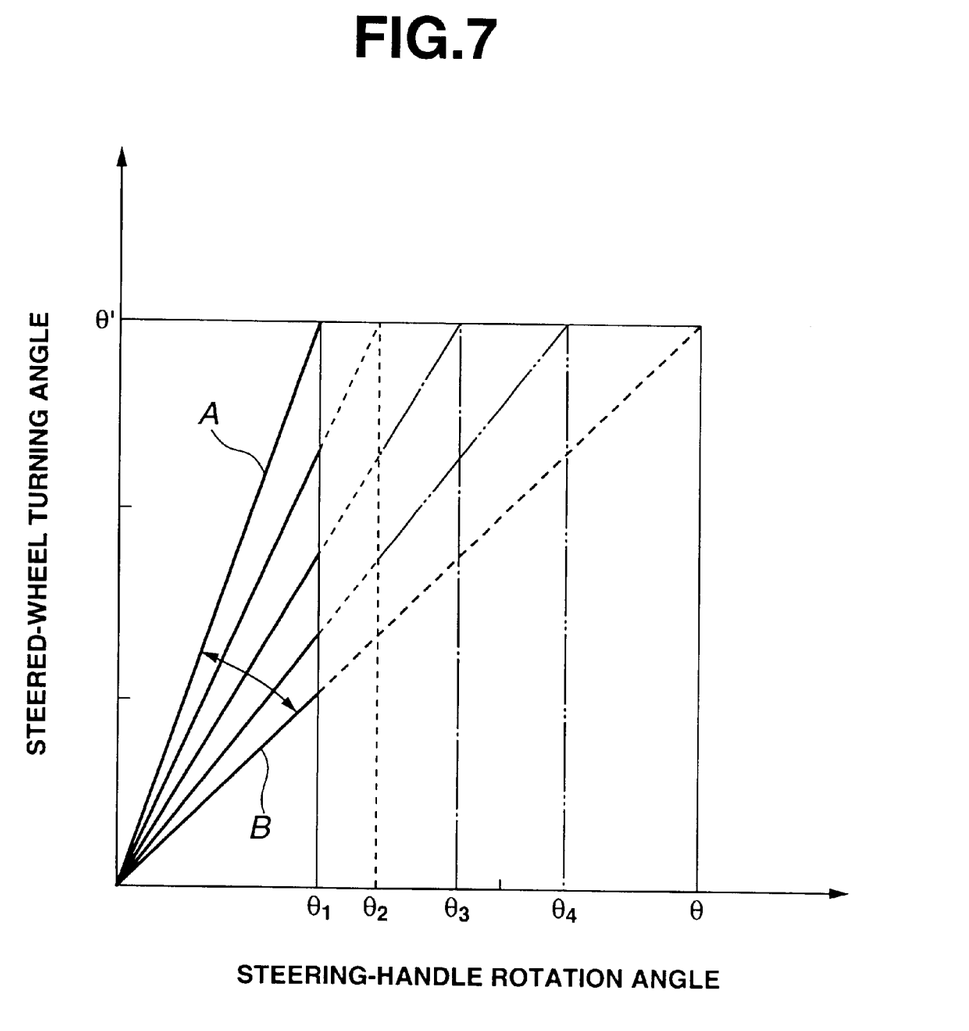
FIG. 7 is a graphical representation illustrating the characteristics of the steering angle of a steering handle vs. the turning angle of a steered wheel.

Referring to FIG. 7, in the first embodiment wherein the steering control apparatus has the peculiar structure as described above, the steered wheel can have turning angle of θ' within the range of the steering angle of the steering handle 10 up to $\theta_1$ and within the practical steering range from low-speed/medium-speed area to high-speed area. Moreover, the characteristics can be varied linearly, steplessly, and continuously. Specifically, in the low-speed/medium-speed area, as shown by solid line A in FIG. 7, when operating the steering handle 10 from the neutral position to the position of steering angle of $\theta_1$, the characteristics change linearly to achieve the turning angle of θ' of the steered wheel. On the other hand, in the high-speed area, as shown by solid line B in FIG. 7, when operating the steering handle 10 from the neutral position to the position of steering angle of $\theta_1$, the characteristics change linearly to achieve the turning angle of the steered wheel of about ⅓ θ'. Within the range between solid lines A and B, i.e. range given by arrow in FIG. 7, the stepless and continuous characteristics can be obtained.

In the first embodiment, therefore, the steering angle of the steering handle 10 in the low-speed/medium-speed area of the vehicle can be attained by one rotation with respect to the apparatus with no variable gear-ratio mechanism wherein three rotations are needed for maximum rightward or leftward turning as shown by broken line B in FIG. 7.

Specifically, the characteristics given by broken line B in FIG. 7 show fixed control of the steering angle and turning angle by the apparatus with no variable gear-ratio mechanism, wherein when turning the steering handle 10 from the neutral position maximally rightward or leftward, i.e. to the position of θ, the turning angle of the steered wheel becomes θ'. On the other hand, in the illustrative embodiment, as described above, the steering angle of the steering handle 10 can be attained by one rotation in the low-speed/medium-speed area, which allows achievement of a larger turning angle by less rotating operation, resulting in excellent steering capability and enhanced safety.

The steering angle of the steering handle 10 is not limited to $\theta_1$, and can freely be set within the range up to θ such as $\theta_2$, $\theta_3$ and $\theta_4$, and the turning angle of the steered wheel can freely be set accordingly. This allows free setting of the gear ratio by actuating the converting mechanism 16 in accordance with a variation in steering angle of the steering handle 10 and vehicle speed, resulting in improved turning of the steering handle 10 by decreasing the gear ratio when garaging the vehicle, etc.

Moreover, free setting of the gear ratio on the side of the steering column 11 allows adoption of steering gears with a single gear ratio, resulting in decreased number of part types.

Particularly, using the vehicle speed as a control parameter, the control range and variation of the variable gear ratio can be set optionally freely, allowing optimum control in accordance with the vehicle speed and vehicle type.

In the illustrative embodiment, the characteristics of the variable gear ratio is set to be linear, leading to improved steering feel of the steering handle 10 and thus enhanced driveability.

Moreover, due to large degree of freedom of variable gear-ratio control as mentioned above, the characteristics of the steering angle of the steering handle 10 vs. the turning angle of the steered wheel can be set non-linearly instead of being set linearly as described above.

Further, some parts of the variable gear-ratio mechanism such as slider 15 and converting mechanism 16 are arranged in the steering column 11, leading to a reduction in size of the apparatus and thus no need of changing layout in the engine room and floor structure. This results in possible application of the apparatus not only to various vehicle types, but also to hydraulic or electric power steering.

Still further, stroke motion of the slider 15 can directly rotate the output shaft 14 only without transferring torque to the input shaft 13, resulting in possible application of the apparatus, for example, to an automatic steering apparatus, an active steering apparatus, etc.

Furthermore, the converting mechanism 16 includes a cylindrical slider mechanism which can convert linear motion into rotary motion, resulting in a reduction in the offset amount with respect to the center of the rotation shaft. Thus, the effect of a moment of inertia on a steering force can nearly be neglected. Since the converting mechanism 16 is in the form of a cylindrical slider mechanism which can convert linear motion into rotary motion, the eccentricity with respect to the center of rotation is eliminated, resulting no occurrence of a variation in steering torque.

Furthermore, as being fixed to a non-rotating portion through an arm with bearing, the motor 33 of the converting mechanism 16 does not rotate together with the rotation shaft, resulting in no effect on a steering effort.

Further, since the converting mechanism 16 includes a ball-screw mechanism, rotation of the balls 30 allows sufficient reduction in frictional resistance between the slider 15 and the output shaft 14, resulting in stable and smooth operation.

Figure 8:
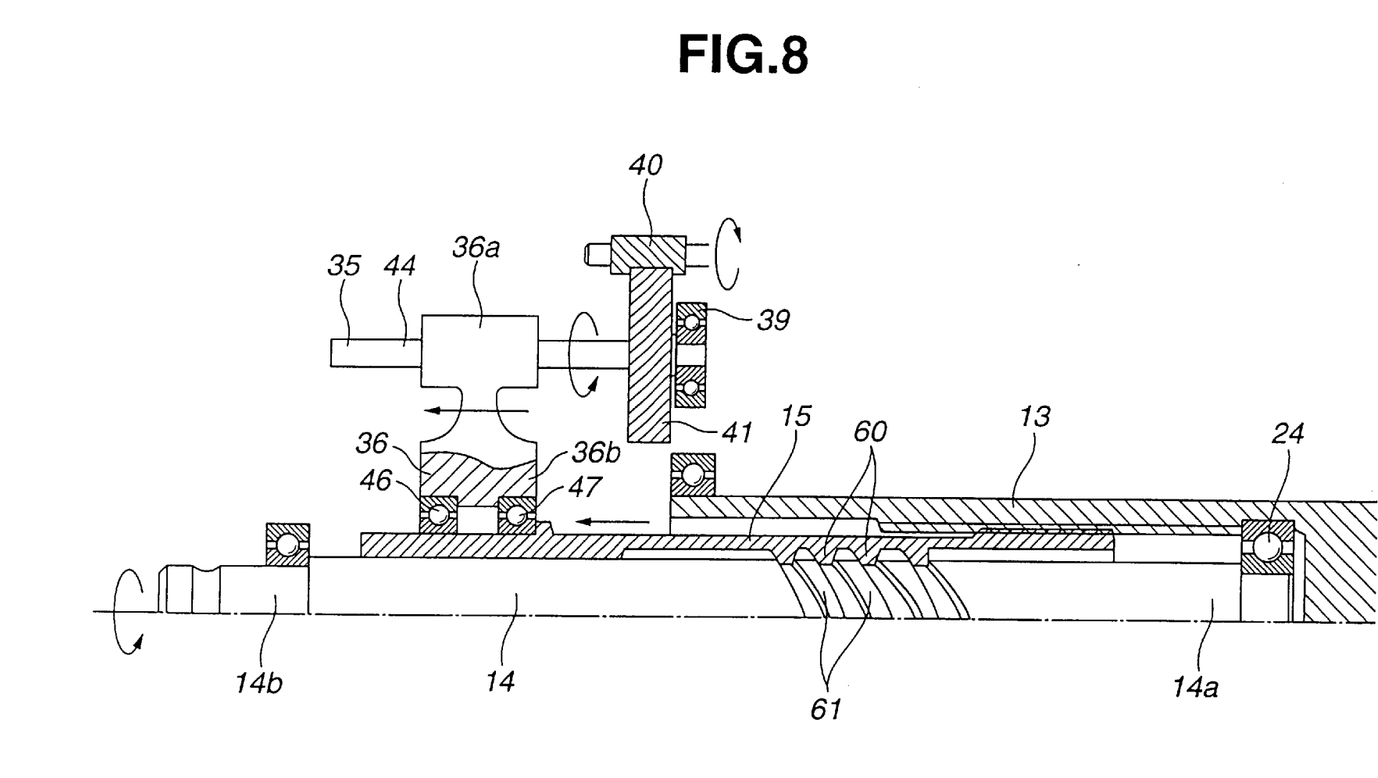
FIG. 8 is a fragmentary longitudinal section showing a second embodiment of the present invention.

FIG. 8 shows a second embodiment of the present invention which is substantially the same in structure as the first embodiment except that the converting mechanism 16 includes an involute-helical-spline mechanism instead of the ball-screw mechanism.

Specifically, helical inner teeth 60 are formed on the inner peripheral face of the slider 15, whereas helical outer teeth 61 meshed with the inner teeth 60 are formed on the outer peripheral face of the output shaft 14.

Thus, when the inner teeth 60 being meshed with the outer teeth 61 are moved axially in accordance with axial stroke motion of the slider 15, torque is transferred to the output shaft 14 through the side faces of the teeth 60, 61 to produce the gear ratio to the steering angle of the steering handle 10 and the turning angle of the steered wheel, providing the same effect as that of the first embodiment. Moreover, due to no need of high machining accuracy of various portions, a reduction in manufacturing cost can be achieved.

FIGS. 9–12 show a third embodiment of the present invention which is substantially the same in structure as the first embodiment except that the structure of the slider 15 of the converting mechanism 16 is changed partly, and an adjusting mechanism 70 is arranged between the internal thread 45 of the one end 36a of the slider arm 36 of the drive mechanism 18 and the lead screw shaft 35 so as to eliminate backlash clearances between thread ridges.

Figure 9:
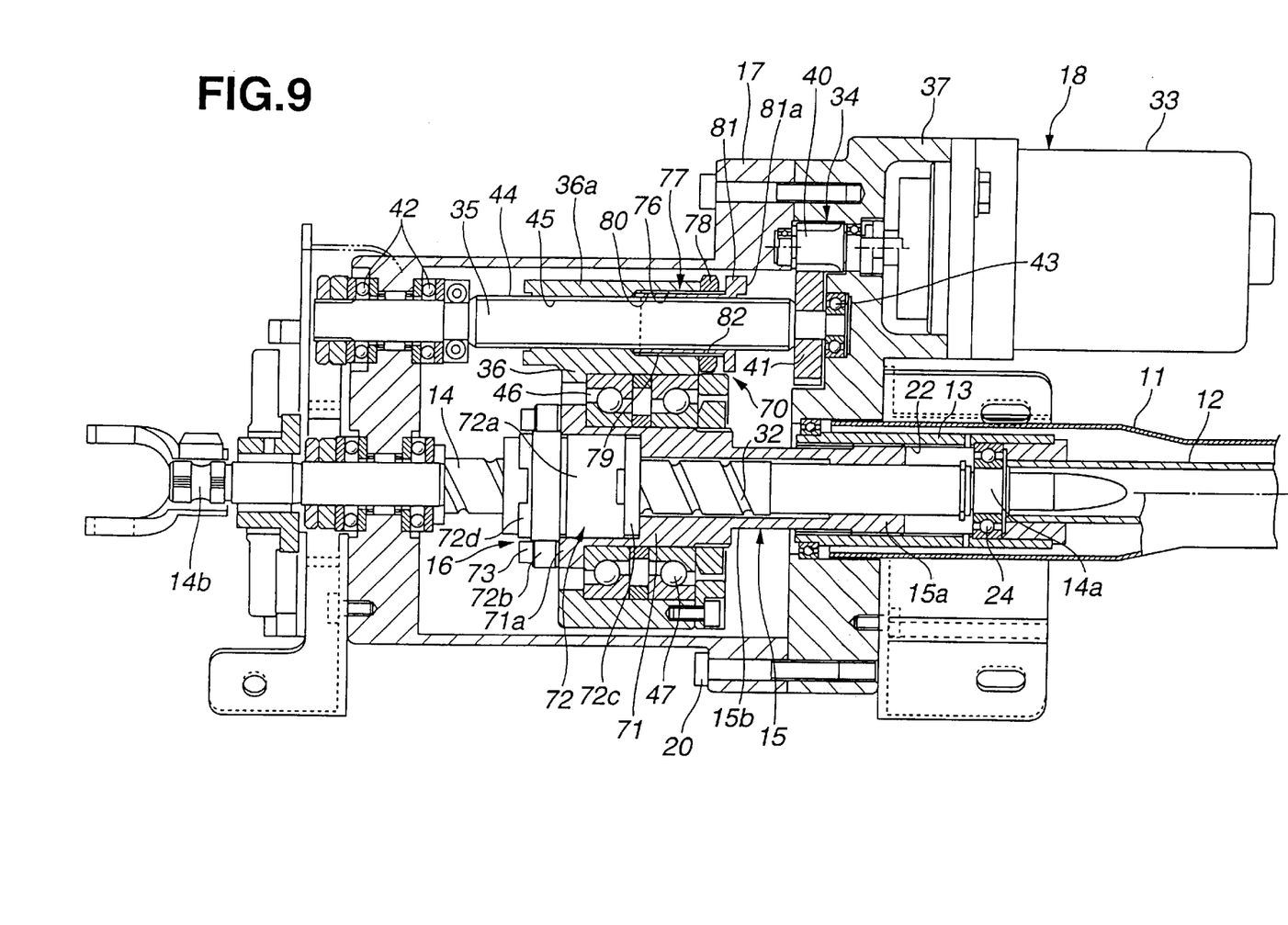
FIG. 9 is a view similar to FIG. 6, showing a third embodiment of the present invention.
Figure 10:
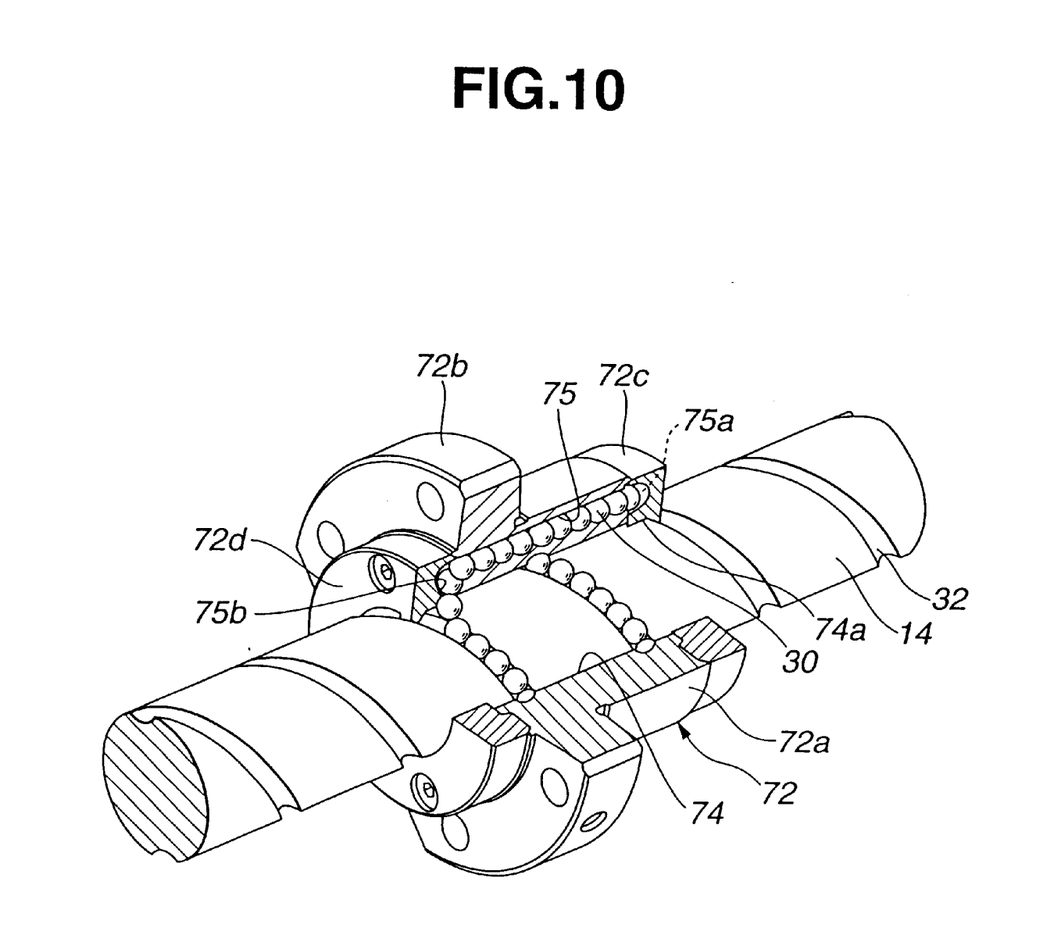
FIG. 10 is a partly cutaway perspective view showing a converting mechanism.

Specifically, referring to FIGS. 9–10, the slider 15 with no ball holding holes 31 has an end on the side of the slider arm 36 formed with a large-diameter thick cylindrical portion 71 to which a holding member 72 holding the balls 30 therein is axially fixed by bolts 73 through respective flanges 71a, 72b for integration with the slider 15.

As shown in FIG, 10, the holding member 72 comprises a cylindrical main body 72a, and first and second end caps 72c, 72d arranged at both ends of the main body 72a. The holding member 72 has a through hole 74 formed in the axial direction of the main body 72a and end caps 72c, 72d, through which the output shaft 14 having outer periphery formed with the ball-screw groove 32 is arranged slidably. Moreover, the holding member 72 has a holding groove 75 formed on the peripheral wall of the main body 72a to hold the balls 30, and ports 75a, 75b formed through the end caps 72c, 72d to provide and remove the balls 30 from the holding groove 75.

Therefore, as mentioned above, when rotation of the motor 33 urges the speed reducer 34 to rotate the lead screw shaft 35 in one direction moving the slider arm 36 rightward from the position shown in FIG. 9 through the external and internal threads 44, 45, the holding member 72 undergoes an axial load. Then, the balls 30 roll in the ball-screw groove 32 while receiving the axial load, and pass through the holding groove 75. And the balls 30 are took from the port 75b of the second end cap 72d, and are provided to the ball-screw groove 32 from the port 75a of the first end cap 72c located on the opposite side. In such a way, the balls 30 perform endless roll motion.

This smoothly provides torque of a prescribed speed to the output shaft 14 in the ball-screw groove 32 which smoothly rotates at a greater variation than a change in steering angle of the steering handle 10 in the steering direction thereof, thus turning the steered wheel at a larger turning angle through the rack/pinion mechanism.

Figure 11:
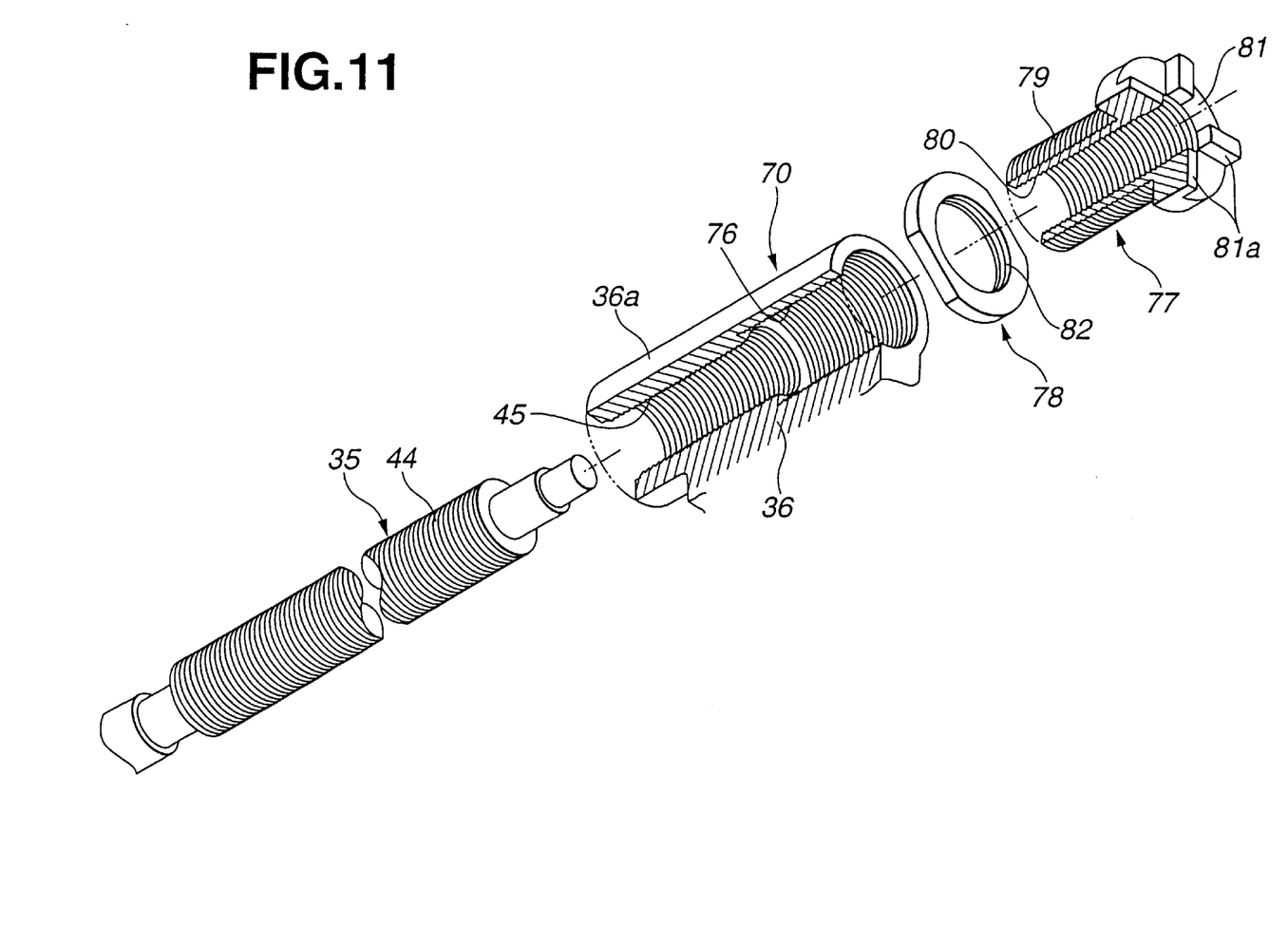
FIG. 11 is an exploded, partly cutaway perspective view showing an adjusting mechanism.
Figure 12:
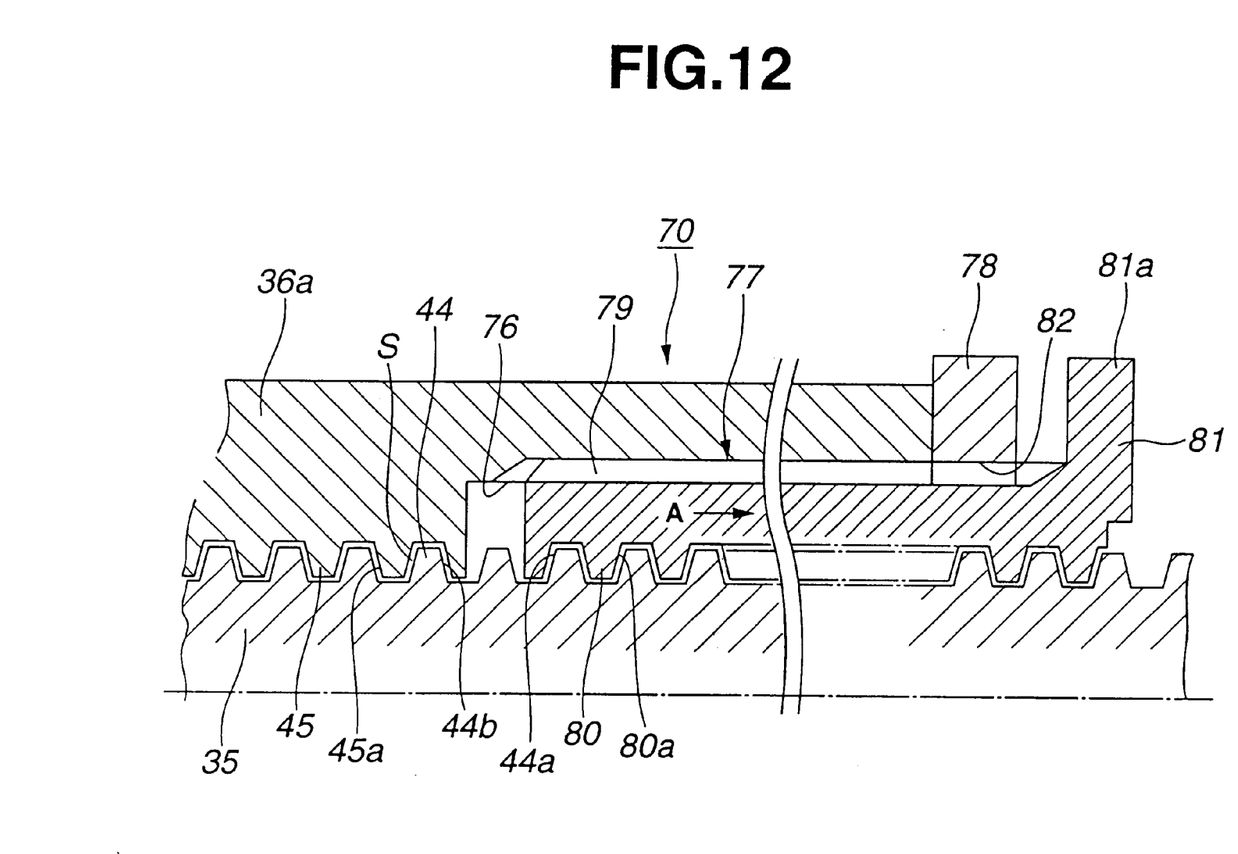
FIG. 12 is a fragmentary longitudinal section for explaining operation of the adjusting mechanism.

As shown in FIGS. 9 and 11–12, the adjusting mechanism 70 comprises a large-diameter adjusting internal thread hole 76 formed at the one end 36a of the slider arm 36 at an end of the internal thread 45 on the side of the motor 33, a cylindrical adjusting screw member 77 engaged with the internal thread hole 76, and a locknut 78 for restricting free rotation of the screw member 77.

The adjusting internal thread hole 76 is of the axial length of about half of the axial length of the internal thread 45.

The adjusting screw member 77 has an external thread 79 formed on the outer peripheral face to be engaged with the adjusting internal thread hole 76, and an internal thread 80 formed on the inner peripheral face to continuously connect with the internal thread 45 and engage with the external thread 44 of the lead screw shaft 35.

The locknut 78 is formed substantially in oval, and has an internal thread 82 formed on the inner peripheral face to engage with the external thread 79 of the adjusting screw member 77.

Therefore, in the third embodiment, the converting mechanism 16 of peculiar structure always allows smooth transmission of rotation as mentioned above.

When assembling the one end 36a of the slider arm 36 to the lead screw shaft 35 during assembly of various components, the locknut 78 is engaged in advance with the external thread 79 on the outer periphery of the adjusting screw member 77, and the adjusting screw member 77 is engaged with the internal thread hole 76 of the one end 36a up to a predetermined depth through the external thread 79. Then, the adjusting screw member 77 is rotated in the reverse direction to obtain movement shown by arrow A in FIG. 12. Then, a tooth flank 80a of the ridge of the internal thread 80 comes in contact with an opposing tooth flank 44a of the external thread 44 of the lead screw shaft 35 to move the lead screw shaft 35 in the same direction by a backlash clearance S. Thus, an opposite-side tooth flank 44b of the external thread 44 comes in contact with a tooth flank 45a of the internal thread 45. As a result, the backlash clearance S between the internal thread 45 and the external thread is 44 and the backlash clearance between the internal thread 80 and the external thread 44 disappear from opposite directions. After being rotated at the position where such backlash clearances ran be eliminated, the adjusting screw member 77 can be fixed at the axially optimum position by tightening the locknut 78.

This allows prevention of backlash of the steering handle 10 in the operating or turning direction from occurring due to axial backlash of the slider arm 36 with respect to the lead screw shaft 35, which is attributable to the backlash clearance S.

Specifically, if axial backlash of the slider arm 36 is produced due to the backlash clearance S, this backlash is transmitted to the slider 15 through the bearings 46, 47 to urge to rotate the output shaft 14 through the holding member 72, balls 30, and ball holding groove 32. However, since the output shaft 14 cannot rotate due to a load from the road surface, that rotation is transmitted to the input shaft 13 through the slider 15. Finally, the backlash phenomenon affects the steering handle 10, resulting in possible deterioration of the turning operability of the steering handle 10.

In the third embodiment, the backlash clearance S is effectively eliminated, allowing full prevention of deterioration of the turning operability of the steering handle 10.

Having described the present invention with regard to the preferred embodiments, it is note that the present invention is not limited thereto, and various changes and modifications can be made without departing from the scope of the present invention. By way of example, the present invention can be applied to a rack/pinion mechanism other than that of the steering column. Moreover, the adjusting mechanism 70 is not limited to that in the third embodiment, and may be constructed to eliminate the backlash clearance by pressing the adjusting screw member in one direction by a spring or the like.

The entire teachings of Japanese Patent Application 2000-400620 filed Dec. 28, 2000 and Japanese Patent Application 2001-369756 filed Dec. 4, 2001 are incorporated hereby by reference.

What is claimed is:

1. A steering control apparatus for a motor vehicle, comprising:

an output shaft which steers a steered wheel;

a slider arranged on an outer periphery of an end part of the output shaft, the slider being slidable axially linearly;

a converting mechanism arranged between the output shaft and the slider, wherein the converting mechanism converts linear motion of the slider into rotation of the output shaft;

a drive mechanism which urges the slider to stroke axially; and an electronic control unit (ECU) which controls the drive mechanism.

2. The steering control apparatus as claimed in claim 1, wherein the converting mechanism includes a ball-screw mechanism.

3. The steering control apparatus as claimed in claim 2, wherein the ball-screw mechanism comprises a plurality of holes formed through a peripheral wall of the slider for holding a plurality of balls, and a groove formed spirally on the outer periphery of the output shaft for rotating the output shaft in accordance with rolling of the balls.

4. The steering control apparatus as claimed in claim 1, wherein the drive mechanism comprises a motor, a speed reducer for reducing a rotating speed of the motor, a rotation shaft rotated by the speed reducer, and a slider arm interposed between the slider and the rotation shaft wherein the slider arm is moved in the axial direction of the rotation shaft in accordance with rotation of the rotation shaft.

5. The steering control apparatus as claimed in claim 1, wherein the ECU controls the drive mechanism in accordance with at least one of signals derived from a plurality of sensors including a vehicle-speed sensor, a steering-angle sensor, and a turning-angle sensor.

6. The steering control apparatus as claimed in claim 1, wherein the converting mechanism includes a helical-spline mechanism.

7. The steering control apparatus as claimed in claim 6, wherein the helical-spline mechanism comprises helical inner teeth formed on an inner periphery of the slider, and helical outer teeth formed on the outer periphery of the output shaft and meshed with the inner teeth.

8. The steering control apparatus as claimed in claim 2, wherein the ball-screw mechanism comprises a holding member integrally formed with an end of the slider for axially movably holding a plurality of balls therein, and a groove formed spirally on the outer periphery of the output shaft for rotating the output shaft in accordance with rolling of the balls.

9. The steering control apparatus as claimed in claim 8, wherein the holding member comprises a cylindrical main body and end caps arranged at both ends of the main body.

10. The steering control apparatus as claimed in claim 9, wherein the holding member has a through hole formed in the axial direction of the main body and end caps for slidably receiving the output shaft, a holding groove formed on a peripheral wall of the main body for holding the balls, and a plurality of ports formed through the end caps for providing and removing the balls from the holding groove.

11. The steering control apparatus as claimed in claim 10, further comprising an adjusting mechanism arranged between the rotation shaft and an end of a slider arm of the drive mechanism, the adjusting mechanism eliminating backlash clearances between an external thread formed on the outer periphery of the rotation shaft and an internal thread formed at the end of the slider arm and meshed with the external thread.

12. The steering control apparatus as claimed in claim 11, wherein the adjusting mechanism comprises a large-diameter internal thread hole formed at the end of the slider arm, a cylindrical screw member engaged with the internal thread hole, and a locknut for restricting rotation of the screw member.

13. The steering control apparatus as claimed in claim 12, wherein the screw member comprises an external thread formed on its outer periphery and engaged with the internal thread hole, and an internal thread formed on its inner periphery and continuously connecting with the internal thread of the end of the slider arm and engaged with the external thread of the rotation shaft.

14. The steering control apparatus as claimed in claim 13, wherein the locknut is formed substantially in oval, and comprises an internal thread formed on its inner periphery and engaged with the external thread of the screw member.

15. The steering control apparatus as claimed in claim 1, further comprising an input shaft which is splined to the slider for synchronous rotation therewith, wherein rotation of the slider by the input shaft rotates the output shaft, and wherein axial stroking of the slider by the drive mechanism rotates the output shaft independently of input shaft rotation.

16. A steering control apparatus for a motor vehicle, comprising:

an input shaft rotated by a steering handle;

an output shaft arranged substantially coaxially with the input shaft, the output shaft steering a steered wheel;

a slider arranged on an outer periphery of an end part of the output shaft on the side of the input shaft and at an end of the input shaft on the side of the output shaft, the slider being slidable axially linearly;

a converting mechanism arranged between the end of the output shaft and the slider, wherein the converting mechanism converts linear motion of the slider into rotation of the output shaft;

a drive mechanism which urges the slider to stroke axially independent of any rotation of the input shaft; and an electronic control unit (ECU) which controls the drive mechanism.

17. The steering control apparatus as claimed in claim 16, wherein the converting mechanism includes a ball-screw mechanism.

18. The steering control apparatus as claimed in claim 17, wherein the ball-screw mechanism comprises a plurality of holes formed through a peripheral wall of the slider for holding a plurality of balls, and a groove formed spirally on the outer periphery of the output shaft for rotating the output shaft in accordance with rolling of the balls.

19. The steering control apparatus as claimed in claim 16, wherein the drive mechanism comprises a motor, a speed reducer for reducing a rotating speed of the motor, a rotation shaft rotated by the speed reducer, and a slider arm interposed between the slider and the rotation shaft wherein the slider arm is moved in the axial direction of the rotation shaft in accordance with rotation of the rotation shaft.

20. The steering control apparatus as claimed in claim 16, wherein the ECU controls the drive mechanism in accordance with at least one of signals derived from a plurality of sensors including a vehicle-speed sensor, a steering-angle sensor, and a turning-angle sensor.

21. The steering control apparatus as claimed in claim 16, wherein the converting mechanism includes a helical-spline mechanism.

22. The steering control apparatus as claimed in claim 21, wherein the helical-spline mechanism comprises helical inner teeth formed on an inner periphery of the slider, and helical outer teeth formed on the outer periphery of the output shaft and meshed with the inner teeth.

23. The steering control apparatus as claimed in claim 17; wherein the ball-screw mechanism comprises a holding member integrally formed with an end of the slider for axially movably holding a plurality of balls therein, and a groove formed spirally on the outer periphery of the output shaft for rotating the output shaft in accordance with rolling of the balls.

24. The steering control apparatus as claimed in claim 23; wherein the holding member comprises a cylindrical main body and end caps arranged at both ends of the main body.

25. The steering control apparatus as claimed in claim 24, wherein the holding member has a through hole formed in the axial direction of the main body and end caps for slidably receiving the output shaft, a holding groove formed on a peripheral wall of the main body for holding the balls, and a plurality of ports formed through the end caps for providing and removing the balls from the holding groove.

26. The steering control apparatus as claimed in claim 25, further comprising an adjusting mechanism arranged between the rotation shaft and an end of a slider arm of the drive mechanism, the adjusting mechanism eliminating backlash clearances between an external thread formed on the outer periphery of the rotation shaft and an internal thread formed at the end of the slider arm and meshed with the external thread.

27. The steering control apparatus as claimed in claim 26, wherein the adjusting mechanism comprises a large-diameter internal thread hole formed at the end of the slider arm, a cylindrical screw member engaged with the internal thread hole, and a locknut for restricting rotation of the screw member.

28. The steering control apparatus as claimed in claim 27, wherein the screw member comprises an external thread formed on its outer periphery and engaged with the internal thread hole, and an internal thread formed on its inner periphery and continuously connecting with the internal thread of the end of the slider arm and engaged with the external thread of the rotation shaft.

29. The steering control apparatus as claimed in claim 28, wherein the locknut is formed substantially in oval, and comprises an internal thread formed on its inner periphery and engaged with the external thread of the screw member.

30. The steering control apparatus as claimed in claim 16, wherein the input shaft is splined to the slider for synchronous rotation therewith, wherein rotation of the slider by the input shaft rotates the output shaft, and wherein axial stroking of the slider by the drive mechanism rotates the output shaft independently of input shaft rotation.

31. A steering control apparatus for a motor vehicle, comprising:

an output shaft which steers a steered wheel;

a slider arranged on an outer periphery of an end part of the output shaft, the slider being slidable axially linearly;

a converting mechanism arranged between the output shaft and the slider, wherein the converting mechanism converts linear motion of the slider into rotation of the output shaft;

a drive mechanism which urges the slider to stroke axially, the drive mechanism comprising a motor, a speed reducer for reducing a rotating speed of the motor, a rotation shaft rotated by the speed reducer, and a slider arm interposed between the slider and the rotation shaft wherein the slider arm is moved in the axial direction of the rotation shaft in accordance with rotation of the rotation shaft; and an electronic control unit (ECU) which controls the drive mechanism.

32. A steering control apparatus for a motor vehicle, comprising:

an input shaft rotated by a steering handle;

an output shaft arranged substantially coaxial with the input shaft, the output shaft steering a steered wheel;

a slider arranged on an outer periphery of an end part of the output shaft on the side of the input shaft and at an end of the input shaft on the side of the output shaft, the slider being slidable axially linearly;

a converting mechanism arranged between the end of the output shaft and the slider, wherein the converting mechanism converts linear motion of the slider into rotation of the output shaft;

a drive mechanism which urges the slider to stroke axially, the drive mechanism comprising a motor, a speed reducer for reducing a rotating speed of the motor, a rotation shaft rotated by the speed reducer, and a slider arm interposed between the slider and the rotation shaft wherein the slider arm is moved in the axial direction of the rotation shaft in accordance with rotation of the rotation shaft; and an electronic control unit (ECU) which controls the drive mechanism.

* * * * *

UNITED STATES PATENT AND TRADEMARK OFFICE
CERTIFICATE OF CORRECTION

PATENT NO.     : 6,675,929 B2
DATED          : January 13, 2004
INVENTOR(S)    : Kotonori Fujiwara et al.

It is certified that error appears in the above-identified patent and that said Letters Patent is hereby corrected as shown below:

Title page,
Item [30], Foreign Application Priority Data, should read:
-- [30]  Foreign Application Priority Data
December 28, 2000     (JP)     2000-400620
December 4, 2001      (JP)     2001-369756 --

Signed and Sealed this

Twenty-second Day of June, 2004

JON W. DUDAS
*Acting Director of the United States Patent and Trademark Office*